(12) United States Patent
Bammer et al.

(10) Patent No.: US 10,654,568 B2
(45) Date of Patent: May 19, 2020

(54) CONTROL SYSTEM FOR CONTROLLING AT LEAST COLLECTIVE PITCH OF ROTOR BLADES OF A MULTI-BLADE ROTOR IN A ROTARY-WING AIRCRAFT

(71) Applicant: AIRBUS HELICOPTERS DEUTSCHLAND GMBH, Donauworth (DE)

(72) Inventors: Benedikt Bammer, Schliersee (DE); Gerald Kuntze-Fechner, Gmund am Tegernsee (DE)

(73) Assignee: AIRBUS HELICOPTER DEUTSCHLAND GMBH, Donauworth (DE)

( * ) Notice: Subject to any disclaimer, the term of this patent is extended or adjusted under 35 U.S.C. 154(b) by 315 days.

(21) Appl. No.: 15/656,514

(22) Filed: Jul. 21, 2017

(65) Prior Publication Data
US 2018/0044008 A1 Feb. 15, 2018

(30) Foreign Application Priority Data
Aug. 11, 2016 (EP) .................... 16400034

(51) Int. Cl.
*B64C 27/605* (2006.01)
*B64C 27/04* (2006.01)

(52) U.S. Cl.
CPC ............ *B64C 27/605* (2013.01); *B64C 27/04* (2013.01)

(58) Field of Classification Search
CPC . B64C 27/04; B64C 27/605; F05D 2220/329; F05D 2260/56

USPC .... 416/90 A, 93 A, 113, 134 R, 174, 245 A, 416/254 B, 248; 415/76
See application file for complete search history.

(56) References Cited

U.S. PATENT DOCUMENTS

| | | | |
|---|---|---|---|
| 2,444,070 A | 6/1948 | Stanley | |
| 2,534,353 A | 12/1950 | Hiller, Jr. et al. | |
| 2,537,623 A | 1/1951 | Campbell | |

(Continued)

FOREIGN PATENT DOCUMENTS

| | | |
|---|---|---|
| CN | 101687546 A | 3/2010 |
| CN | 105480414 | 4/2016 |

(Continued)

OTHER PUBLICATIONS

Extended European Search Report for European Application No. EP 16400034.1, Completed by the European Patent Office, dated Feb. 1, 2017, 8 Pages.

(Continued)

*Primary Examiner* — Igor Kershteyn
*Assistant Examiner* — Danielle M. Christensen
(74) *Attorney, Agent, or Firm* — Brooks Kushman P.C.

(57) ABSTRACT

A control system for controlling at least collective pitch of rotor blades, of a multi-blade rotor with a rotor shaft in a rotary-wing aircraft, the control system comprising a non-rotating sliding sleeve that is mountable to the rotor shaft such that the non-rotating sliding sleeve is axially displaceable coaxially to an associated rotor axis on the rotor shaft, at least one actuator arm that is pivotally mounted to the non-rotating sliding sleeve and adapted for axially displacing the non-rotating sliding sleeve that is mounted to the rotor shaft upon activation, and at least one hinge support that is adapted for a hinged support of the at least one actuator arm.

20 Claims, 6 Drawing Sheets

(56) References Cited

U.S. PATENT DOCUMENTS

| | | |
|---|---|---|
| 2,599,690 A | 6/1952 | Buivid et al. |
| 2,829,721 A | 4/1958 | Gebhard |
| 3,006,418 A | 10/1961 | Spielman |
| 4,113,910 A | 9/1978 | Loyd |
| 4,630,998 A * | 12/1986 | Leman .................. B64C 27/605 |
| | | 416/114 |
| 4,868,962 A | 9/1989 | McArdle et al. |
| 5,071,319 A | 12/1991 | McCafferty |
| 5,171,099 A | 12/1992 | Westre |
| 5,641,133 A | 6/1997 | Toossi |
| 8,844,877 B1 | 9/2014 | Driemeyer et al. |
| 2003/0205011 A1 | 11/2003 | Bequet |
| 2006/0032982 A1 | 2/2006 | Stephens |
| 2007/0253819 A1 | 11/2007 | Doorenspleet et al. |
| 2010/0196161 A1 | 8/2010 | Uebori et al. |
| 2011/0315820 A1 | 12/2011 | Andre |
| 2012/0275924 A1 | 11/2012 | Perkinson |
| 2013/0142565 A1 | 6/2013 | Couffignal et al. |
| 2014/0232153 A1 | 8/2014 | Bell et al. |
| 2015/0203190 A1 | 7/2015 | Witte et al. |
| 2016/0200433 A1 * | 7/2016 | Ferrant .................. B64C 27/48 |
| | | 416/134 A |

FOREIGN PATENT DOCUMENTS

| | | |
|---|---|---|
| EP | 0105419 | 4/1984 |
| EP | 0452248 | 10/1991 |
| EP | 2662281 | 11/2013 |
| EP | 2979978 | 2/2016 |
| WO | 2012130977 | 10/2012 |
| WO | 2012131335 | 10/2012 |
| WO | 2013079918 | 6/2013 |

OTHER PUBLICATIONS

Chinese Office Action dated Jan. 22, 2020, Application No. 201710676681.7, Applicant Airbus Helicopters Deutschland GMBH (with English Translation—Notice of the First Office Action), 16 Pages.

* cited by examiner

CONTROL SYSTEM FOR CONTROLLING AT LEAST COLLECTIVE PITCH OF ROTOR BLADES OF A MULTI-BLADE ROTOR IN A ROTARY-WING AIRCRAFT

CROSS-REFERENCE TO RELATED APPLICATIONS

This application claims priority to European patent application No. EP 16400034.1 filed on Aug. 11, 2016, the disclosure of which is incorporated in its entirety by reference herein.

BACKGROUND OF THE INVENTION

(1) Field of the Invention

The invention is related to a control system for controlling at least collective pitch of rotor blades of a multi-blade rotor in a rotary-wing aircraft.

(2) Description of Related Art

A control system for controlling at least collective pitch of rotor blades of a multi-blade rotor in a rotary-wing aircraft, in particular of rotor blades of a main rotor in a helicopter, is used in operation for rotating the rotor blades integrally around associated blade pitch control longitudinal axes by means of suitable pitch levers associated with the rotor blades that are operated by corresponding pitch control rods. Each pitch control rod is, therefore, connected to a rotating plate rotating in operation with and around a rotor axis of the rotor. This rotating plate is mounted to rotate on a non-rotating plate, which is restrained against any rotation around the rotor axis of the rotor by a connection connecting the non-rotating plate to a non-rotatable underlying structure of the rotary-wing aircraft, such as its fuselage or main gear box.

The rotating plate and the non-rotating plate define a so-called swash plate assembly and are usually annular and surround the rotor axis. This swash plate assembly is activatable by means of a suitable control input unit via associated control actuators for respectively controlling at least the collective pitch of the rotor blades. More specifically, the swash plate assembly is adapted to transfer control inputs from a non-rotating system that includes the suitable control input unit and the non-rotating plate to a rotating system that includes the rotating plate and, when being mounted to the rotary-wing aircraft, also the rotor blades of the multi-blade rotor, i. e. the rotatable rotor as such.

The rotating and non-rotating plates are usually displaceable axially parallel to the rotor axis for controlling collective pitch, and in general they can be tilted in any direction around the rotor axis for controlling cyclic pitch, e. g. by means of an axially displaceable central spherical bearing. The latter, on which the non-rotating plate is mounted in an oscillating manner, is generally centered on the rotor axis.

While the control systems of bigger rotary-wing aircrafts frequently use spherical bearings as described above, control systems of some smaller and mid-size rotary-wing aircrafts use gimbals with e. g. cardan-joint or u-joint rings for mounting at least a non-rotating plate of a swash plate assembly of the control system in an oscillating manner. The gimbals can be mounted on associated sliding sleeves. In such control systems, corresponding control inputs to the swash plate assembly can be mixed by a control input unit that is embodied e. g. as a so-called mixing lever gear unit and arranged underneath the swash plate assembly. For collective pitch control, the sliding sleeve can be displaced axially parallel to a rotor axis of the associated rotor by a mixing lever gear unit fork of the mixing lever gear unit.

The document EP 2 979 978 A1 describes a control system with a central spherical bearing on which a non-rotating plate of a swash plate assembly is mounted. The spherical bearing is mounted to a non-rotating sliding sleeve, wherein a rotor shaft of an associated rotor is rotatably received. This non-rotating sliding sleeve can be displaced axially parallel to a rotor axis of the rotor for controlling collective pitch, while rotating and non-rotating plates of this control system can be tilted in any direction around the rotor axis for controlling cyclic pitch. For controlling axial displacement of the non-rotating sliding sleeve in operation, a fork unit with an associated actuator arm is provided. The associated actuator arm is pivotally mounted to a mounting part of the non-rotating sliding sleeve, which is formed at—or by—a lower section of the non-rotating sliding sleeve. The actuator arm is further hinged on a hinge support such that a rotational movement of the actuator arm on the hinge support upon activation is translatable into a pivotal movement of the actuator arm on the non-rotating sliding sleeve at the mounting part that is adapted to cause an axial displacement on the rotor shaft of the non-rotating sliding sleeve.

However, during the rotational movement of the actuator arm and, thus, during collective control, a predetermined distance between an underlying hinge axis defined by the hinge support and the rotor shaft increases or decreases dependent on a respectively resulting sliding direction of the non-rotating sliding sleeve on the rotor shaft that is induced by the actuator arm. In other words, due to a linear shifting of the non-rotating sliding sleeve along the rotor shaft, respective joints of the actuator arm to the hinge support perform an additional movement Δs, which is essentially oriented in horizontal direction with respect to a normal orientation of a given rotary-wing aircraft on ground and varies up to several millimeters during the rotational movement of the actuator arm. This additional movement Δs in combination with high forces, of e. g. about 60 kn for a 3 to rotary-wing aircraft, must be handled by the hinge support.

Therefore, the hinge support is designed as a complex mechanical component that is usually made of metal and comprises a hinge carrier, a bearing block and suitable bearing attaches that connect the hinge carrier to the bearing block, such as spherical bearings or liner bushes. The hinge carrier is connected to the actuator arm, e. g. by means of a suitable hinge rod that defines the hinge axis, so that the actuator arm can perform its rotational movement around this hinge rod. The bearing block in turn is fixedly mounted to a main gear box of an associated rotary-wing aircraft.

It should be noted that the hinge carrier and the bearing block need to absorb comparatively high loads coming from an associated multi-blade main rotor of an associated rotary-wing aircraft. These loads include high pressure and tension combined with shear forces.

However, while this complex hinge support exhibits a comparatively high stiffness and overall structural strength so that it can advantageously even be used to inhibit rotation of the fork unit and, thus, the non-rotating sliding sleeve, it is generally comparatively heavy and comprises a comparatively great number of individual components. Furthermore, it is comparatively clumsy, in particular due to the use of the spherical bearings or liner bushes between the hinge carrier and the bearing block, and requires comparatively extensive maintenance efforts. Moreover, as this complex hinge support is usually at least essentially made up of metal, it is prone to corrosion.

Other hinge supports are exemplarily described in the documents EP 0 452 248 A2, U.S. Pat. Nos. 2,829,721, 2,534,353, 2,537,623, 2,599,690, 2,444,070 and 3,006,418. These documents respectively describe control systems for controlling at least collective pitch of rotor blades of a multi-blade rotor in a rotary-wing aircraft, which are at least similar to the above described control system.

BRIEF SUMMARY OF THE INVENTION

It is, therefore, an object of the present invention to provide a new control system for controlling at least collective pitch of rotor blades of a multi-blade rotor in a rotary-wing aircraft, said new control system comprising a new hinge support with reduced weight and a reduced number of constituent components compared to hinge supports of conventional control systems, said new hinge support being suitable to replace said hinge supports of conventional control systems.

This object is solved by a control system for controlling at least collective pitch of rotor blades of a multi-blade rotor in a rotary-wing aircraft, said control system comprising the features of claim 1.

More specifically, according to the present invention a control system for controlling at least collective pitch of rotor blades of a multi-blade rotor in a rotary-wing aircraft, wherein the multi-blade rotor comprises a rotor shaft that defines an associated rotor axis, comprises: a non-rotating sliding sleeve, at least one actuator arm and at least one hinge support. The non-rotating sliding sleeve is mountable to the rotor shaft such that the non-rotating sliding sleeve is axially displaceable coaxially to the associated rotor axis on the rotor shaft. The at least one actuator arm is pivotally mounted to the non-rotating sliding sleeve and adapted for axially displacing the non-rotating sliding sleeve that is mounted to the rotor shaft upon activation. The at least one hinge support is adapted for a hinged support of the at least one actuator arm such that a rotational movement of the at least one actuator arm on the at least one hinge support upon activation is translatable into a pivotal movement of the at least one actuator arm on the non-rotating sliding sleeve that is adapted to cause an axial displacement on the rotor shaft of the non-rotating sliding sleeve that is mounted to the rotor shaft. The at least one hinge support comprises at least one carrier element that is adapted for carrying the at least one actuator arm, the at least one carrier element comprising fiber reinforced composite material.

The inventive control system preferably comprises a swash plate assembly with a rotating plate and a non-rotating plate, which is mounted to a spherical bearing having a ball that is arranged on the non-rotating sliding sleeve, and which is adapted for enabling collective and cyclic pitch control. Such a spherical bearing is much simpler, has less parts and is lighter than a gimbal, i. e. a cardan-joint or u-joint, which may, however, alternatively also be used for realization of the inventive control system.

It should be noted that the terms "rotating" and "non-rotating" are meant to describe in the context of the present invention a predetermined characteristic of respective components with respect to their operation, which is predefined due to a respective utilization of these components. In other words, a component that is referred to as being "rotating" is necessarily rotated, alone or together with other components, during operation, and a component that is referred to as being "non-rotating" is necessarily inhibited from rotation during operation. Furthermore, it should be noted that the term "rotatably" is used as a synonym for the expression "in a rotatable manner".

Preferably, the non-rotating plate of the swash plate assembly is mounted to the ball of the spherical bearing such that is can be tilted in any direction around an associated sliding sleeve axis of the non-rotating sliding sleeve. As this mounting allows one degree of freedom to the non-rotating plate for rotation around the ball, i. e. the spherical bearing, preferably at least one non-rotating stop arm is provided to inhibit such a rotation.

This non-rotating stop arm is, preferably, not adapted to be fixed on a non-rotatable underlying structure of a given rotary-wing aircraft, such as a main gear box or a cylindrical tubular guide that is rigidly attached to a fuselage of the rotary-wing aircraft. Instead, the non-rotating stop arm is arranged in the non-rotating system of the control system and, therein, preferably non-rotatably attached to the non-rotating sliding sleeve and the non-rotating plate. Thus, motion of the non-rotating stop arm, i. e. extensions or retractions, advantageously only occurs in cyclic pitch control, but not in collective pitch control, where the non-rotating stop arm is entirely moved together with the non-rotating sliding sleeve and the non-rotating plate. Consequently, as the non-rotating stop arm is only required to perform cyclic motion in operation, it's durability can be prolonged.

According to one aspect of the present invention, the collective pitch control is performed by the at least one actuator arm in connection with the at least one hinge support and the non-rotating sliding sleeve. The at least one hinge support is preferably at least essentially made out of fiber reinforced composite material. Thus, a lightweight composite design can be provided that preferentially comprises a simple lay-up and attachment concept, so that advantageously complex and heavy standard parts that are used in hinge supports of conventional control systems are no longer required. Accordingly, an overall weight of the control system can be reduced.

Preferably, the at least one hinge support is built up with two main components, a fiber hinge support, which is adapted for supporting the at least one actuator arm in a hinged manner and which is also referred to as the "carrier element" hereinafter, and a base element, both of which preferentially comprise fiber reinforced composite material, in particular glass and/or carbon fiber reinforced composite material. Both parts are preferably bonded together and secured to each other with countersunk head bolts, which are screwed in double barrel nuts. Use of such barrel nuts for connecting composite components in aircrafts is exemplarily described in the documents US 2015/203190 A1, U.S. Pat. No. 8,844,877 B1, US 2014/0232153 A1, EP 2 662 281 A2, EP 2 785 586 A1, US 2012/0275924 A1, WO 2012/130977 A1, EP 2 691 296 A2, US 2013/0142565 A1, US 2011/0315820 A1, US 2007/0253819 A1, US 2006/0032982 A1, US 2003/0205011 A1, U.S. Pat. Nos. 5,641,133 A, 5,171,099 A, 4,868,962 A, EP 0 105 419 A2 and U.S. Pat. No. 4,113,910 A.

More specifically, the connection between the carrier element and the base element is based on the bearing stress reinforced laminate principle. Two double barrel nuts in connection with countersunk screws preferentially clamp the carrier element and the base element together. The base element in turn is preferably mounted to a structural component of the rotary-wing aircraft, preferably to a main gear box thereof, e. g. by means of other screws. Thus, in mounted condition, the countersunk screws are restrained by the main gear box against releasing the connection between the carrier element and the base element. In addition, the carrier element and the base element are preferably bonded together on respective contact surfaces, preferentially over their whole contact area.

Consequently, the connection between the carrier element and the base element is designed bearing-free, i. e. without bearings and, in particular, without spherical bearings and/or carbide bushes as in the hinge supports of conventional control systems. Thus, maintenance efforts and costs can be reduced significantly due to the omission of such bearings. Furthermore, due to the comparatively simple lay-up of the at least one hinge support according to the present invention and the easy concept, its assembling and manufacturing costs can be reduced significantly. Moreover, there are no longer wear out or problems occurring with torqueing screws which are used in such bearings.

According to one aspect of the present invention, the carrier element comprises a flexible portion that is designed with lamellas, respectively slots. These lamellas, respectively slots, allow a bending movement of the carrier element. During such a bending movement, respective accommodations that accommodate the at least one actuator arm in the hinged manner and that are also referred to as "bearing eyes", move in parallel. This occurs as the lamellas have no hinges on their respective axial ends, so that they are bend at least approximately in an S-Shape.

In other words, the carrier element is preferably designed flexible in its width direction by means of the lamellas, respectively slots, for allowing an elastic deformation of the carrier element due to an induced displacement of its bearing eyes. Furthermore, it is preferably designed stiff in its length direction and, moreover, it is preferably adapted for carrying high tension and pressure loads in its height direction, e. g. approximately 60 kN for a 3 to rotary-wing aircraft.

Preferably, the carrier element is laid-up as follows: Two unidirectional (UD)-loops (outer and inner UD-loop) carry vertical loads. Both UD-loops are provided with lamellas respectively slots at a predetermined flexible area of the carrier element, which allows a parallel, i. e. bending movement and, therefore, a required hinge function. The UD-loops are preferentially preformed separately in according molds and cured together in a subsequent step by resin infusion and suitable curing processes, which may also be processes that are already known from the state of the art. For transferring occurring loads from the carrier element into the base element by means of the barrel nuts, the base element is preferably implemented as a reinforced bearing laminate.

According to a preferred embodiment, the at least one carrier element comprises at least one elastically deformable support arm.

According to a further preferred embodiment, the at least one elastically deformable support arm comprises at least one slotted section that is elastically deformable.

According to a further preferred embodiment, the at least one slotted section is defined by elastically deformable lamellas.

According to a further preferred embodiment, the at least one hinge support comprises a base element that is mountable to the rotary-wing aircraft, in particular to a gear box of the rotary-wing aircraft, wherein the at least one carrier element is rigidly mounted to the base element.

According to a further preferred embodiment, the at least one carrier element is bonded to the base element.

According to a further preferred embodiment, the at least one elastically deformable support arm accommodates at least one barrel nut that is screwed to at least one screw that is attached to the base element.

According to a further preferred embodiment, the at least one carrier element comprises at least one accommodation that accommodates the at least one actuator arm.

According to a further preferred embodiment, the at least one accommodation is provided for the hinged support of the at least one actuator arm with a bearing that supports the at least one actuator arm in a rotatable manner.

According to a further preferred embodiment, the at least one actuator arm is at least partly implemented as a fork that is connected in a pivotal manner to a mounting part of the non-rotating sliding sleeve by means of an associated fork mounting point.

According to a further preferred embodiment, a swash plate assembly is provided, the swash plate assembly being mounted to the non-rotating sliding sleeve by means of a spherical bearing provided on the non-rotating sliding sleeve, wherein the swash plate assembly is provided for controlling collective and cyclic pitch of the rotor blades of a multi-blade rotor in a rotary-wing aircraft, to which the control system is mounted.

According to a further preferred embodiment, at least one actuator lever is provided for controlling tilting of the swash plate assembly in operation in order to perform cyclic pitch control, wherein the at least one actuator lever is rotatably mounted to the at least one actuator arm by means of an associated actuator lever pivot bearing.

According to a further preferred embodiment, the at least one actuator lever is connected to the swash plate assembly by means of associated swash plate control rods.

According to a further preferred embodiment, the at least one actuator lever and the at least one actuator arm define a control input unit, in particular a mixing lever gear unit.

The present invention further provides a rotary-wing aircraft with a multi-blade rotor having a plurality of rotor blades and a rotor shaft that defines an associated rotor axis. The rotary-wing aircraft comprises a control system for controlling at least collective pitch of the plurality of rotor blades. The control system comprises: a non-rotating sliding sleeve that is mountable to the rotor shaft such that the non-rotating sliding sleeve is axially displaceable coaxially to the associated rotor axis on the rotor shaft; at least one actuator arm that is pivotally mounted to the non-rotating sliding sleeve, the at least one actuator arm being adapted for axially displacing the non-rotating sliding sleeve that is mounted to the rotor shaft upon activation; at least one hinge support that is adapted for a hinged support of the at least one actuator arm such that a rotational movement of the at least one actuator arm on the at least one hinge support upon activation is translatable into a pivotal movement of the at least one actuator arm on the non-rotating sliding sleeve that is adapted to cause an axial displacement on the rotor shaft of the non-rotating sliding sleeve that is mounted to the rotor shaft. The at least one hinge support comprises at least one carrier element that is adapted for carrying the at least one actuator arm, the at least one carrier element comprising fiber reinforced composite material.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
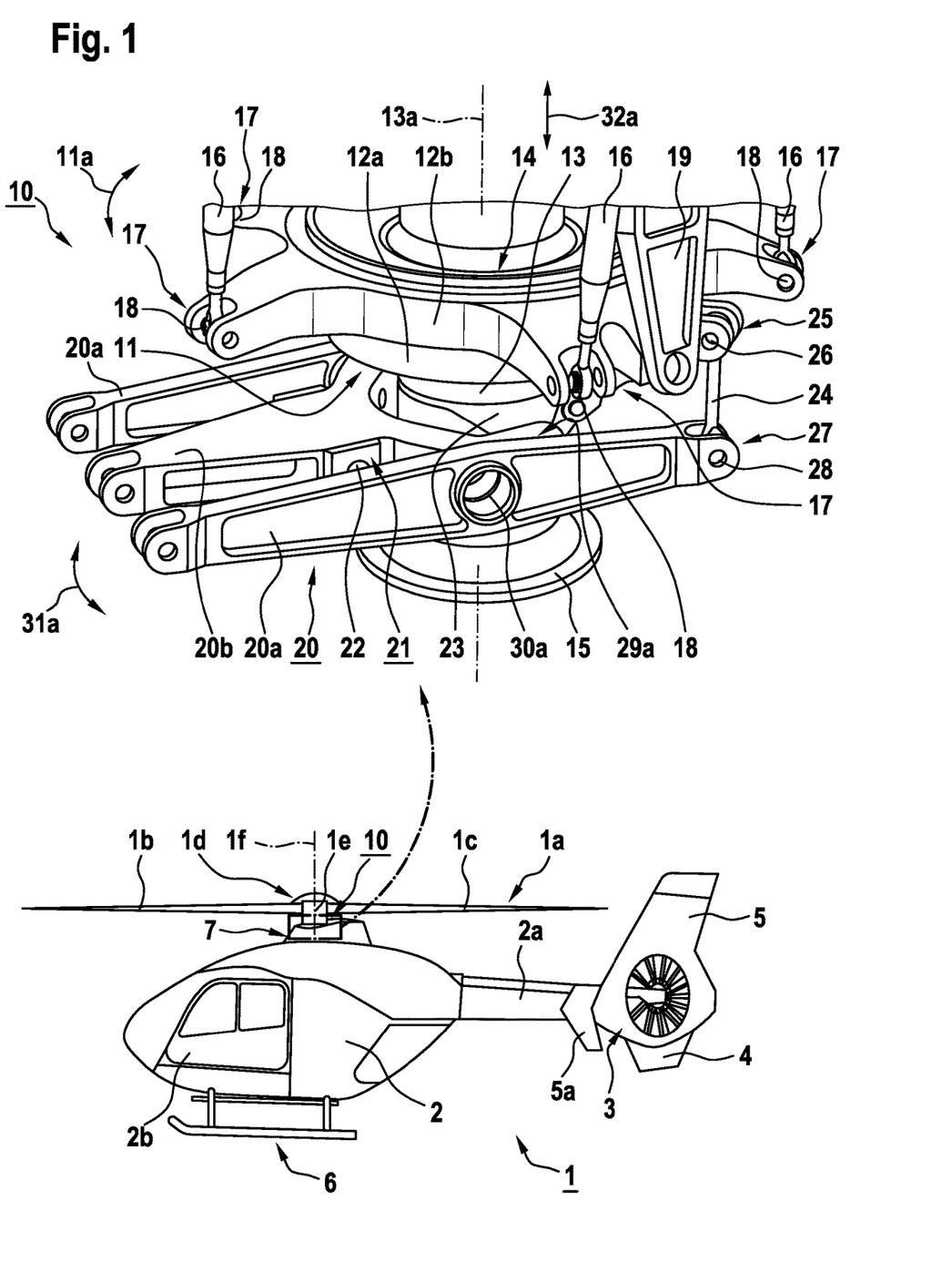
FIG. 1 shows a lateral view of a rotary-wing aircraft with an inventive control system and an enlarged perspective view of the control system according to the invention.

FIG. 1 shows a rotary-wing aircraft 1 with a fuselage 2 that is connected to a landing gear 6, said fuselage 2 defining a tail boom 2a and a cabin 2b. The rotary-wing aircraft 1 comprises at least one multi-blade rotor 1a for providing lift and forward or backward thrust during operation. The at least one multi-blade rotor 1a comprises a plurality of rotor blades 1b, 1c that are mounted at an associated rotor head 1d to a rotor shaft 1e, which rotates in operation of the rotary-wing aircraft 1 around an associated rotor axis 1f.

By way of example, the rotary-wing aircraft 1 is embodied as a helicopter, which comprises at least one preferentially shrouded counter-torque device 3 configured to provide counter-torque during operation, i. e. to counter the torque created by rotation of the at least one multi-blade rotor 1a for purposes of balancing the rotary-wing aircraft 1 in terms of yaw. The at least one counter-torque device 3 is illustratively provided at an aft section of the tail boom 2a, which preferably further comprises a bumper 4, a tail wing 5a and a fin 5. The tail wing 5a is preferably adjustable in its inclination and can, thus, overtake the functioning of a horizontal stabilizer. Alternatively, or in addition, the rotary-wing aircraft 1 is provided with a suitable horizontal stabilizer.

However, it should be noted that the at least one counter-torque device 3, the tail wing 5a as well as the fin 5 with the bumper 4 provided at the aft section of the tail boom 2a are merely described for illustrating one exemplary embodiment of the rotary-wing aircraft 1 and not for limiting the invention accordingly. Instead, the present invention as described hereinafter can likewise be applied to any rotary-wing aircraft and, in particular, any helicopter, independent of a respective construction of the aft section thereof.

According to one aspect, the rotary-wing aircraft 1 comprises a control system 10 for controlling at least collective pitch of the rotor blades 1b, 1c of the at least one multi-blade rotor 1a, and preferably collective and cyclic pitch of the rotor blades 1b, 1c of the at least one multi-blade rotor 1a. The control system 10, which is further detailed in an enlarged perspective detail view, is preferentially arranged at least partly on the rotor shaft 1e between the rotor head 1d of the at least one multi-blade rotor 1a and a main gear box 7 of the rotary-wing aircraft 1.

Figure 2:
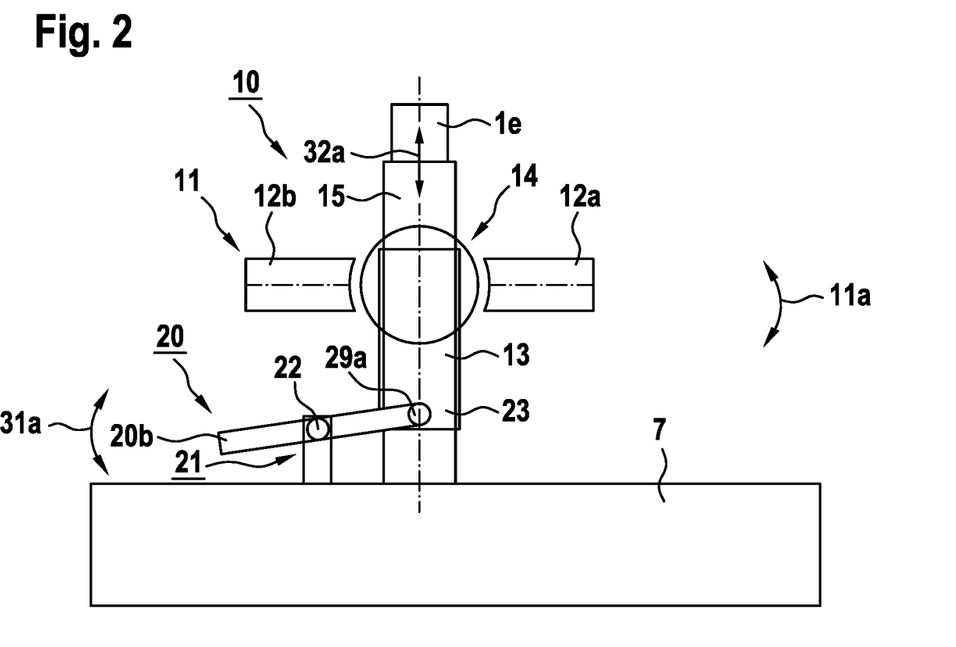
FIG. 2 shows a schematic side view of a simplified version of the control system of FIG. 1, with a hinge support according to the present invention.

Preferably, the control system 10 comprises at least a non-rotating sliding sleeve 13 that is mountable, and illustratively mounted to the rotor shaft 1e, as illustrated in greater detail in FIG. 2, such that the non-rotating sliding sleeve 13 is axially displaceable coaxially to the rotor axis 1f on the rotor shaft 1e. The non-rotating sliding sleeve 13 is preferentially connected to at least one actuator arm 20b that is pivotally mounted to the non-rotating sliding sleeve 13 and adapted for axially displacing the non-rotating sliding sleeve 13 that is mounted to the rotor shaft 1e upon activation.

The control system 10 preferably further comprises at least one hinge support 21 that is adapted for a hinged support of the at least one actuator arm 20b such that a rotational movement of the at least one actuator arm 20b on the at least one hinge support 21 upon activation is translatable into a pivotal movement of the at least one actuator arm 20b on the non-rotating sliding sleeve 13 that is adapted to cause an axial displacement of the non-rotating sliding sleeve 13 that is mounted to the rotor shaft 1e on the rotor shaft 1e in predetermined axial displacement directions 32a. Preferably, the at least one hinge support 21 comprises at least one carrier element (21a in FIG. 3 to FIG. 9) that is adapted for carrying the at least one actuator arm 20b and that comprises fiber reinforced composite material.

The at least one hinge support 21 and, more specifically, the at least one carrier element (21a in FIG. 3 to FIG. 9) preferentially carries the at least one actuator arm 20b by means of an associated support member 22. The latter is preferably embodied as a support rod that defines an associated rotation axis, around which the at least one actuator arm 20b can be rotated to perform the above described rotational movement in predetermined rotational movement directions 31a.

According to one aspect, the control system 10 further comprises a swash plate assembly 11 with at least one non-rotating plate 12a and at least one rotating plate 12b that is mounted rotatably to the at least one non-rotating plate 12a. Illustratively, the at least one rotating plate 12b defines an upper swash plate and the at least one non-rotating plate 12a defines a lower swash plate of this swash plate assembly 11.

The at least one non-rotating and rotating plates 12a, 12b are preferably at least partly disk-shaped and connected to each other by means of an associated roller or ball bearing that allows relative rotational movement between these plates 12a, 12b. In this configuration, the at least one non-rotating and rotating plates 12a, 12b are preferably mainly superposed. However, they can also, or alternatively, be at least partly ring-shaped. In such a configuration, the at least one rotating plate 12b mainly encompasses the at least one non-rotating plate 12a.

According to one aspect, the at least one rotating plate 12b and the at least one non-rotating plate 12a are mounted to the non-rotating sliding sleeve 13 having an associated sliding sleeve axis 13a. Preferably, the non-rotating sliding sleeve 13 is glidingly arranged on a non-rotating sliding sleeve guide 15. This non-rotating sliding sleeve guide 15 is adapted for accommodating at least partly the rotor shaft 1e of the at least one multi-blade rotor 1a, which illustratively extends in its longitudinal extension through said non-rotating sliding sleeve guide 15. Furthermore, the non-rotating sliding sleeve guide 15 is adapted for rigid fixation to a non-rotating part of the rotary-wing aircraft 1. Illustratively, the non-rotating sliding sleeve guide 15 is rigidly attached to the main gear box 7 of the rotary-wing aircraft 1, e. g. by means of screwing, bolting or bonding.

According to one aspect, the at least one rotating plate 12b is rotatable around the associated sliding sleeve axis 13a of the non-rotating sliding sleeve 13 and mounted with the at least one non-rotating plate 12a to a spherical bearing 14 that is provided on the non-rotating sliding sleeve 13. For instance, the spherical bearing 14 is embodied as a ball joint with a ball, which is rigidly attached to the non-rotating sliding sleeve 13 or integrally formed in one piece therewith.

Preferably, the at least one rotating plate 12b and the at least one non-rotating plate 12a are mounted to the spherical bearing 14 such that they are tiltable in any direction around the associated sliding sleeve axis 13a by means of said spherical bearing 14. Allowable tilting angles between the associated sliding sleeve axis 13a and the at least one non-rotating and rotating plates 12a, 12b preferentially do not exceed 20°.

The at least one rotating plate 12b is preferably connectable, and illustratively connected, to each one of the rotor blades 1b, 1c by means of an associated pitch control rod 16. Therefore, external radial clevises 17, equal in number to the rotor blades 1b, 1c, are distributed over an external periphery of the at least one rotating plate 12b, preferentially evenly, and in each such external radial clevis 17 a ball joint 18 is held, which articulates a lower end of an associated pitch control rod 16, while its upper end can be articulated, and is illustratively articulated, in a pitch lever of an associated one of the rotor blades 1b, 1c, preferentially also in a ball joint. Furthermore, the at least one rotating plate 12b is at least indirectly rotatably connectable, and is illustratively connected, to the rotor shaft 1e of the multi-blade rotor 1a by means of at least one associated rotating torque link, which is by way of example embodied as a rotating arm 19.

For controlling tilting and/or axial displacement of the at least one rotating plate 12b and the at least one non-rotating plate 12a in operation, a control input unit 20 is provided. This control input unit 20 preferentially comprises two actuator levers 20a and the at least one actuator arm 20b, which is preferably embodied as a fork unit 20b, preferentially as a so-called mixing lever gear unit. Each actuator lever 20a is illustratively embodied as a lateral or outer arm of the control input unit 20 and preferably rotatably connected to the at least one actuator arm 20b, which is illustratively embodied as an inner fork, by means of an associated actuator lever pivot bearing 30a.

The at least one actuator lever 20a is connected to the at least one non-rotating plate 12a by means of associated swash plate control rods 24 for controlling tilting of the at least one non-rotating plate 12a and, thus, of the at least one rotating plate 12b in any required tilting direction 11a around the rotor axis 1f, thereby performing cyclic pitch control of the rotor blades 1b, 1c. Therefore, external radial clevises 25, equal in number to the associated swash plate control rods 24, are provided on an external periphery of the at least one non-rotating plate 12a, and in each such external radial clevis 25 a ball joint 26 is held, which articulates an upper end of an associated swash plate control rod 24, while its lower end is articulated in a corresponding ball joint 28, which is held in a clevis 27 provided on an extremity of an associated actuator lever 20a.

As described above, the at least one actuator arm 20b is provided for controlling axial displacement of the non-rotating sliding sleeve 13 in operation. Therefore, the at least one actuator arm 20b is rotatably connected to a mounting part 23 of the non-rotating sliding sleeve 13 at a corresponding mounting point 29a. The mounting part 23 is illustratively formed at—or by—a lower section of the non-rotating sliding sleeve 13 that takes preferably up to a third of the overall length of said non-rotating sliding sleeve 1.

It should be noted that the above described configuration of the control system 10 is merely described for purposes of illustration and not for restricting the invention solely thereto. Instead, various modifications and variations are readily available and recognizable to the skilled person and, therefore, also considered as being part of the present invention. For instance, instead of the spherical bearing 14, gimbals with e.g. cardan-joint or u-joint rings for mounting at least the non-rotating plate 12a of the swash plate assembly 11 of the control system 10 in an oscillating manner can be used, etc.

In operation of the control system 10, a rotational movement of the at least one actuator arm 20b into one of the rotational movement directions 31a around the support member 22 is translated into an axial displacement of the non-rotating sliding sleeve 13 and, thus, of the swash plate assembly 11, into an associated one of the axial displacement directions 32a along the associated sliding sleeve axis 13a. Thus, collective pitch of the rotor blades 1b, 1c of FIG. 1 can be controlled.

Furthermore, a rotational movement of the at least one actuator lever 20a around the associated actuator lever pivot bearing 30a into one of the rotational movement directions 31a is translated via the associated swash plate control rods 24 into a tilting of the swash plate assembly 11 into a corresponding one of the swash plate tilting directions 11a around the associated sliding sleeve axis 13a. Thus, cyclic pitch of the rotor blades 1b, 1c of FIG. 1 can be controlled.

FIG. 2 shows a simplified schematic view of the control system 10 of FIG. 1 with the swash plate assembly 11, the non-rotating sliding sleeve 13 and the at least one actuator arm 20b, for further illustrating the possible rotational movement directions 31a of the at least one actuator arm 20b, the possible axial displacement directions 32a of the non-rotating sliding sleeve 13 and the possible swash plate tilting directions 11a of the swash plate assembly 11. Illustration of the at least one actuator lever 20a is omitted for simplicity and clarity of the drawings.

FIG. 2 further illustrates the at least one hinge support 21 of the control system 10, which is adapted for the hinged support of the at least one actuator arm 20b. As described above, the at least one hinge support 21 and, more specifically, the at least one carrier element (21a in FIG. 3 to FIG. 9) of the at least one hinge support 21 preferentially carries the at least one actuator arm 20b by means of the associated support member 22. As also described above, the at least one actuator arm 20b is preferably rotatably connected to the mounting part 23 of the non-rotating sliding sleeve 13 at the corresponding mounting point 29a.

Figure 3:
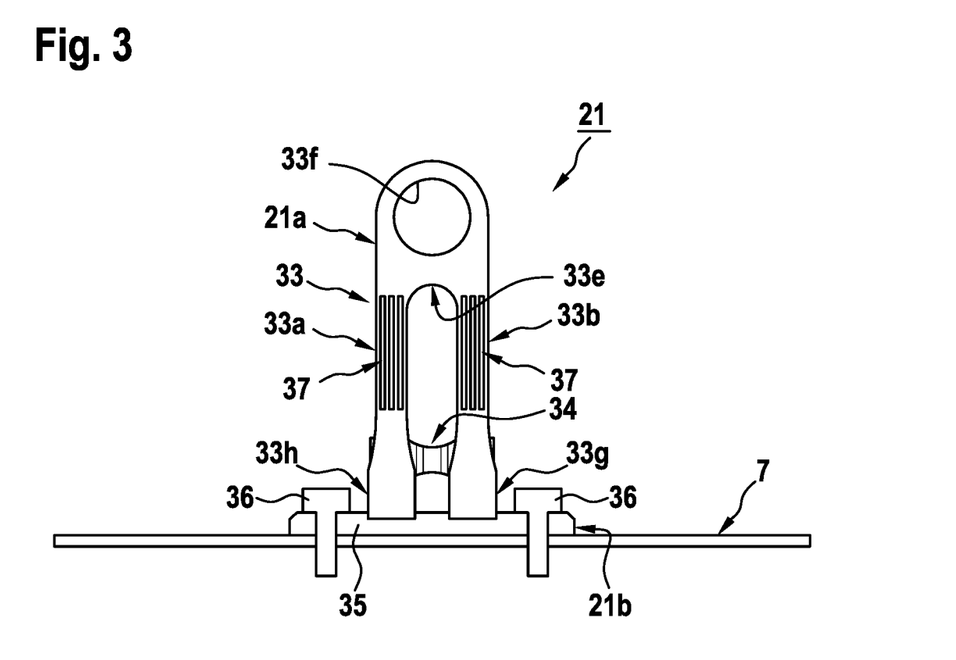
FIG. 3 shows a partially sectional side view of the hinge support of FIG. 2.

FIG. 3 shows the at least one hinge support 21 of FIG. 1 and FIG. 2. As described above, the at least one hinge support 21 is preferably adapted for a hinged support of the at least one actuator arm 20b of FIG. 1 and FIG. 2.

According to one aspect, the at least one hinge support 21 comprises at least one carrier element 21a that is adapted for carrying the at least one actuator arm 20b of FIG. 1 and FIG. 2. The at least one carrier element 21a preferentially comprises fiber reinforced composite material, as described above, and in particular glass and/or carbon fiber reinforced composite material. Preferably, the at least one carrier element 21a comprises at least one accommodation 33f that accommodates the at least one actuator arm 20b of FIG. 1 and FIG. 2. The at least one accommodation 33f is preferentially provided for the hinged support of the at least one actuator arm 20b of FIG. 1 and FIG. 2 with a bearing or bushing that supports the at least one actuator arm 20b in a rotatable manner.

Preferably, the at least one carrier element 21a comprises at least one and, preferentially, a plurality of elastically deformable support arms 33. In FIG. 3, two elastically deformable support arms 33a, 33b are illustrated, which are preferentially interconnected at an associated interconnection region 33e. However, more than two elastically deformable support arms are also contemplated and, by way of example, in a preferred realization illustrated in FIG. 4 and FIG. 5, two more elastically deformable support arms 33c, 33d are shown.

The at least one of the two elastically deformable support arms 33a, 33b and, preferably, each one of the plurality of elastically deformable support arms 33 preferentially comprises at least one slotted section 37 that is elastically deformable. The at least one slotted section 37 is preferably defined by elastically deformable lamellas or slots created in the at least one of the two elastically deformable support arms 33a, 33b and, preferably, in each one of the plurality of elastically deformable support arms 33 of the at least one carrier element 21a.

Preferably, the at least one hinge support 21 further comprises a base element 21b that is mountable to the rotary-wing aircraft 1 of FIG. 1, e. g. to a gear box of the rotary-wing aircraft 1 and, in particular, to the main gear box 7 of FIG. 1. Illustratively, the base element 21b is embodied as a base plate 35, preferably a reinforced bearing laminate, and mounted to the main gear box 7 by means of suitable screws 36. The base element 21b is preferentially rigidly mounted to the at least one carrier element 21a. Preferably, the base element 21b also comprises fiber reinforced composite material, in particular glass and/or carbon fiber reinforced composite material.

According to one aspect, the at least one carrier element 21a is bonded to the base element 21b, illustratively at respective support arm bases 33g, 33h. In addition, or alternatively, at least one of the plurality of elastically deformable support arms 33 and, preferably, each one of the plurality of elastically deformable support arms 33 accommodates at least one barrel nut 34 that is screwed to at least one screw (39 in FIG. 5 and FIG. 6) that is attached to the base element 21b.

Figure 4:
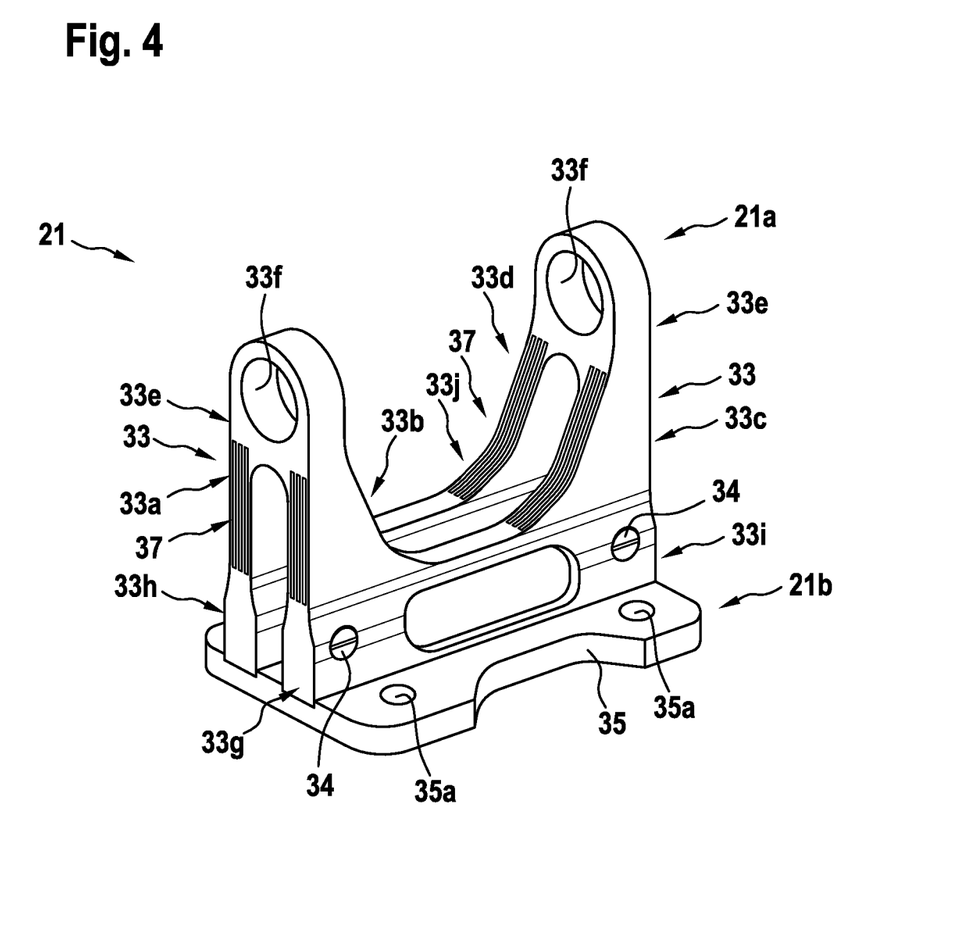
FIG. 4 shows a perspective view of the hinge support of FIG. 3.

FIG. 4 shows the at least one hinge support 21 of FIG. 3. However, it should be noted that for simplicity and clarity of the drawings only a single hinge support 21 is shown and described hereinafter, for clarity and conciseness of the description.

As described above, the hinge support 21 is preferably adapted for a hinged support of the at least one actuator arm 20b of FIG. 1 and FIG. 2 and illustratively comprises a single carrier element 21a according to FIG. 3 and a single base element 21b according to FIG. 3 that is embodied as the base plate 35 of FIG. 3. The carrier element 21a illustratively comprises the two elastically deformable support arms 33a, 33b of FIG. 3 that are interconnected in the associated interconnection region 33e of FIG. 3, as well as two more elastically deformable support arms 33c, 33d, which are also interconnected in an associated interconnection region that is also labelled 33e, for simplicity. The four elastically deformable support arms 33a, 33b, 33c, 33d define the plurality of elastically deformable support arms 33 of FIG. 3. The two elastically deformable support arms 33a, 33b comprise the slotted sections 37 of FIG. 3 and the two more elastically deformable support arms 33c, 33d likewise comprise such slotted sections that is also labelled 37 for simplicity. Furthermore, the two elastically deformable support arms 33a, 33b comprise the support arm bases 33h, 33g of FIG. 3, respectively, and the two more elastically deformable support arms 33c, 33d comprise associated support arm bases 33i, 33j, respectively. The support arm bases 33g, 33h, 33i, 33j accommodate the barrel nuts 34 of FIG. 3.

According to one aspect, the support arm bases 33g and 33i are connected to each other and form a first common bar-shaped base of the carrier element 21a. Likewise, the support arm bases 33h and 33j are also connected to each other and form a second common bar-shaped base of the carrier element 21a. The first and second bar-shaped bases are preferably arranged in parallel. Thus, the carrier element 21a as such is illustratively U-shaped.

As described above, the carrier element 21a is bonded to the base element 21b at the respective support arm bases 33g, 33h and, preferentially, likewise also at the respective support arm bases 33i, 33j. Preferably, the carrier element 21a is bonded to the base element 21b, i. e. to the base plate 35, all along the first and second common bar-shaped bases.

As further described above, the base element 21b, i. e. the base plate 35 is mounted to the main gear box 7 of FIG. 1 by means of suitable screws 36 of FIG. 3. Therefore, the base plate 35a preferably comprises a plurality of openings 35a, which are preferentially embodied as through-holes and adapted for accommodation of the suitable screws 36 of FIG. 3.

Figure 5:
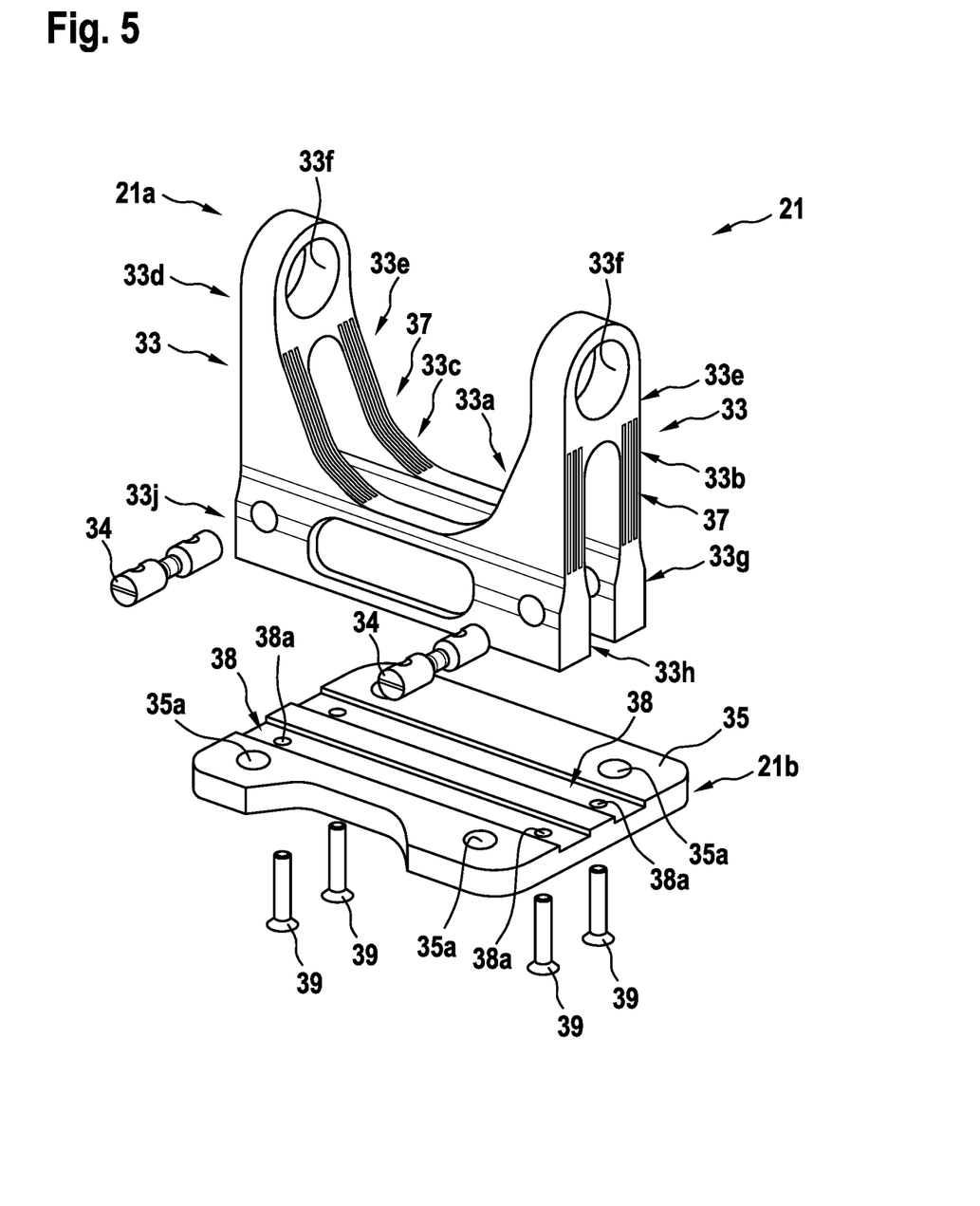
FIG. 5 shows an exploded perspective view of the hinge support of FIG. 4.

FIG. 5 shows the hinge support 21 of FIG. 3 and FIG. 4 with the carrier element 21a and the base element 21b that is embodied as the base plate 35 of FIG. 3. The carrier element 21a comprises the plurality of elastically deformable support arms 33, i. e. the elastically deformable support arms 33a, 33b, 33c, 33d, which comprise the support arm bases 33h, 33g, 33i, 33j, respectively. The base element 21b, i. e. the base plate 35 comprises the openings 35a and preferably at least two longitudinal grooves 38 for an at least partial accommodation of the support arm bases 33h, 33g, 33i, 33j, i. e. for an at least partial accommodation of the first and second common bar-shaped bases described with reference to FIG. 4.

According to one aspect, the longitudinal grooves 38 are provided with a plurality of openings 38a, which are preferentially embodied as through-holes and adapted for accommodation of associated screws 39. The associated screws 39 are preferably embodied as countersunk screws and provided for being screwed into the barrel nuts 34 of FIG. 3 and FIG. 4, which are accommodated in the support arm bases 33h, 33g, 33i, 33j.

Preferably, a first barrel nut 34 is commonly accommodated in the support arm bases 33h, 33g and a second barrel nut 34 is commonly accommodated in the support arm bases 33i, 33j. Thus, the support arm bases 33h, 33g, 33i, 33j are preferably connected to the longitudinal grooves 38 by means of a bonding connection, as described above, and the bonding connection is secured by means of the associated screws 39, which are inserted from a side of the base plate 35 that is opposed to a side, where the carrier element 21a is arranged, and which are then screwed into the barrel nuts 34 that are accommodated in the support arm bases 33h, 33g, 33i, 33j.

Figure 6:
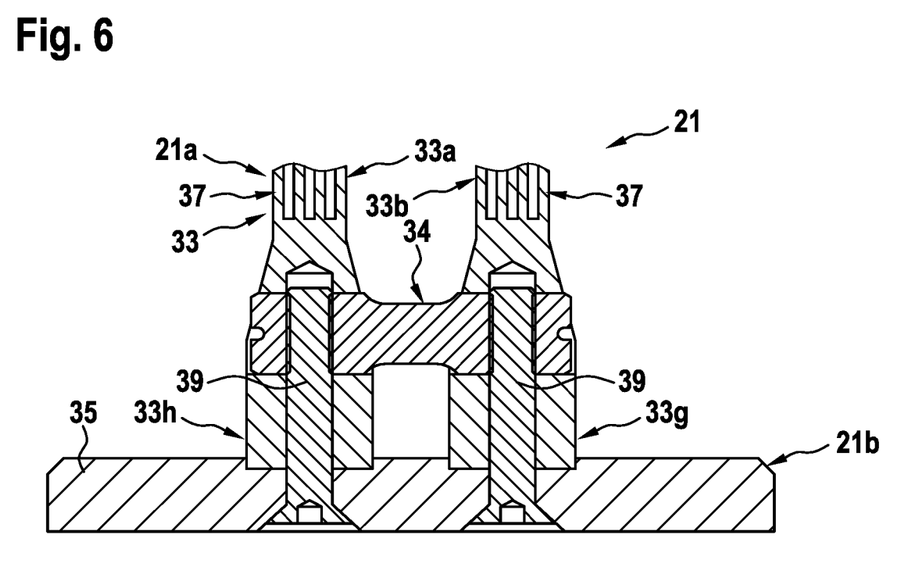
FIG. 6 shows an enlarged detail of the hinge support of FIG. 4.

FIG. 6 shows the support arm bases 33h, 33g which accommodate the first barrel nut 34 as described above with reference to FIG. 5. FIG. 6 further illustrates the associated screws 39 that traverse the base plate 35 of FIG. 5 and the support arm bases 33h, 33g at least partly, and which are screwed into the first barrel nut 34. As the associated screws 39 are preferably embodied as countersunk screws, they are preferentially not protruding from the base plate 35 in a direction opposed to the support arm bases 33h, 33g.

Figure 7:
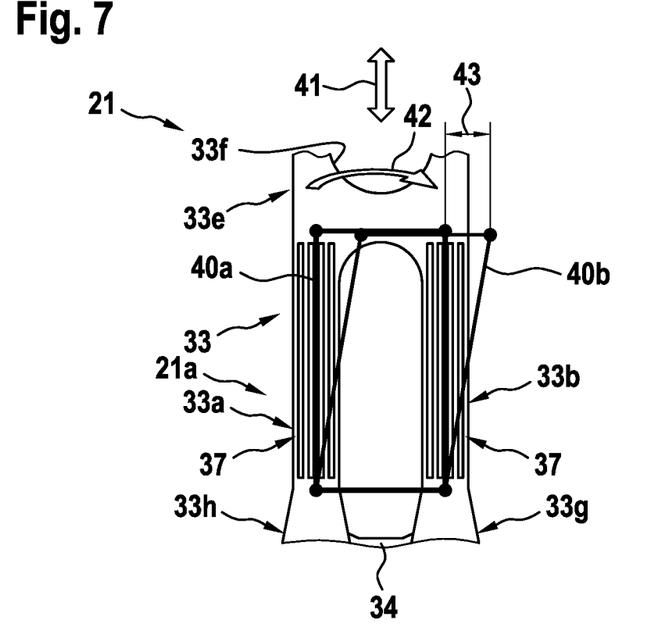
FIG. 7 shows a schematic diagram illustrating an exemplary operation of the hinge support of FIG. 4.

FIG. 7 shows the carrier element 21a of the preceding figures, which is for simplicity and clarity of the drawings only represented by the elastically deformable support arms 33a, 33b with the respective slotted sections 37. The carrier element 21a is illustrated in a non-deformed position 40a and schematically shown in a deformed position 40b. According to one aspect, the non-deformed position 40a corresponds to a position, wherein the at least one actuator arm 20b of FIG. 1 and FIG. 2, which is accommodated in the carrier element 21a in a rotatable manner as described above, is not operated, i. e. not activated.

Upon operation, i. e. activation of the at least one actuator arm 20b, the latter is rotated on the carrier element 21a in the rotational movement direction 31a of FIG. 1 and FIG. 2 and induces the axial displacement to the non-rotating sliding sleeve 13 of FIG. 1 and FIG. 2 into the axial displacement direction 32a of FIG. 1 and FIG. 2, as described above. This leads to a resulting force 41 that is applied by the at least one actuator arm 20b to the carrier element 21a. According to one aspect, the resulting force 41 causes an elastic deformation of the carrier element 21a that leads to a displacement of an upper portion of the carrier element 21a into a displacement direction 42 for a predetermined displacement distance 43, such that the carrier element 21a moves into its deformed position 40b.

Upon release of the at least one actuator arm 20b of FIG. 1 and FIG. 2, the carrier element 21a returns from the deformed position into its non-deformed position.

Figure 8:
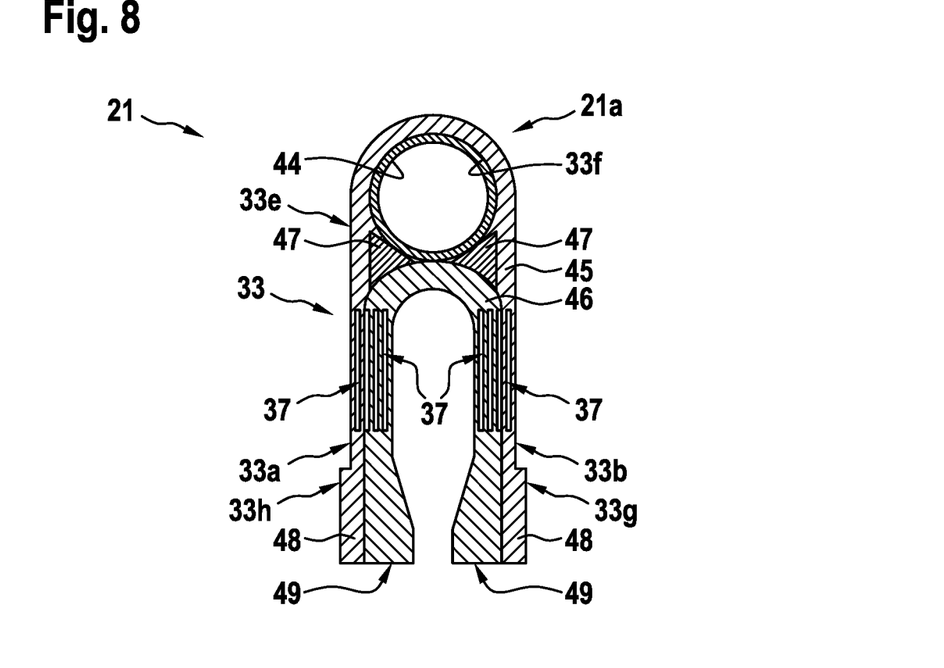
FIG. 8 shows a schematic view of an exemplary realization of a carrier element of the hinge support of FIG. 4.

FIG. 8 shows the carrier element 21a of the preceding figures, which is for simplicity and clarity of the drawings only represented by the elastically deformable support arms 33a, 33b with the respective slotted sections 37, the respective support arm bases 33h, 33g, the interconnection region 33e and the accommodation 33f. The latter is illustratively provided with a fiber sleeve 44 that is laminated from fibers in the form of a sleeve into the accommodation 33f. Preferably, a metal bushing is glued into the fiber sleeve 44 such as to define a gliding bearing. However, provision of any other gliding bearing, in particular in the form of a bearing ring or suitable bushing, is likewise contemplated.

According to one aspect, the carrier element 21a comprises two unidirectional (UD)-loops, an outer UD-loop 45 and inner UD-loop 46, both of which are preferentially adapted for carrying vertical loads, such as e. g. generated by the resulting force 41 of FIG. 7. Both UD-loops 45, 46 are provided with lamellas respectively slots at a predetermined flexible area, preferably in the slotted sections of the carrier element 21a, i. e. the elastically deformable support arms 33a, 33b. Furthermore, the UD-loop 45 preferably defines extended outer base portions 48 and the UD-loop 46 preferably defines inner reinforced portions 49 at the respective support arm bases 33h, 33g. The outer base portions 48 and the inner reinforced portions 49 are preferentially embodied as reinforced bearing laminates.

The UD-loops 45, 46 are preferably preformed separately in according molds and cured together in a subsequent step by resin infusion and suitable curing processes, which may be processes that are already known from the state of the art. In the interconnection region 33e, preferably suitable fill elements 47 are provided for stiffening the interconnection region 33e.

Figure 9:
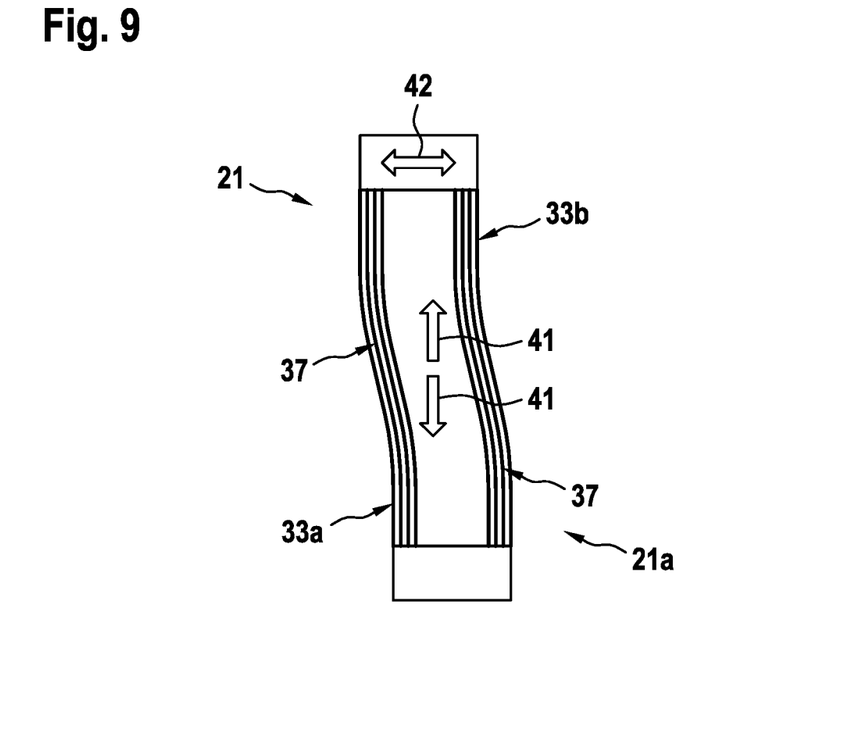
FIG. 9 shows another schematic diagram illustrating an exemplary operation of the hinge support of FIG. 4.

FIG. 9 shows the carrier element 21a of FIG. 8, which is for simplicity and clarity of the drawings only schematically represented by the slotted sections 37 of the elastically deformable support arms 33a, 33b in the deformed position 40b of FIG. 7. FIG. 9 illustrates a possible elastic deformation of the elastically deformable support arms 33a, 33b in the deformed position 40b.

REFERENCE LIST 1 rotary-wing aircraft
1a multi-blade rotor
1b, 1c rotor blades
1d rotor head
1e rotor shaft
1f rotor axis
2 fuselage
2a tail boom
2b cabin
3 counter-torque device
4 bumper
5 fin
5a tail wing
6 landing gear
7 main gear box
10 control system
11 swash plate assembly
11a swash plate tilting directions
12a non-rotating plate
12b rotating plate
13 non-rotating sliding sleeve
13a sliding sleeve axis
14 spherical bearing
15 non-rotating sliding sleeve guide
16 pitch control rods
17 rotating plate clevises
18 rotating plate ball joints
19 rotating arms
20 control input unit
20a outer actuator levers
20b inner actuator arm
21 inner actuator arm hinge support
21a carrier element
21b base element
22 inner actuator arm support member
23 sliding sleeve mounting part
24 swash plate control rods
25 non-rotating plate clevises
26 non-rotating plate ball joints
27 actuator arm clevises
28 actuator arm ball joints
29a inner actuator arm mounting point
30a actuator lever pivot bearing
31a actuator arm rotational movement directions
32a sliding sleeve axial displacement directions
33 elastically deformable lateral support arms
33a, 33b, 33c, 33d elastically deformable lateral support arm
33e arm interconnection region
33f inner actuator arm support member accommodation
33g, 33h, 33i, 33j lateral support arm bases
34 barrel nuts
35 base plate
35a base plate openings
36 screws
37 lamella resp. slotted sections
38 support grooves
38a support groove openings
39 screws
40a non-deformed position
40b deformed position 41 resulting force
42 displacement direction
43 lateral displacement distance
44 fiber sleeve
45 outer loop
46 inner loop
47 fill elements
48 outer base portions
49 inner reinforced portions

What is claimed is:

1. A control system for controlling at least collective pitch of rotor blades of a multi-blade rotor in a rotary-wing aircraft, wherein the multi-blade rotor comprises a rotor shaft that defines an associated rotor axis, the control system comprising:
a non-rotating sliding sleeve that is mountable to the rotor shaft such that the non-rotating sliding sleeve is axially displaceable coaxially to the associated rotor axis on the rotor shaft,
at least one actuator arm that is pivotally mounted to the non-rotating sliding sleeve, the at least one actuator arm being adapted for axially displacing the non-rotating sliding sleeve that is mounted to the rotor shaft upon activation,
at least one hinge support that is adapted for a hinged support of the at least one actuator arm such that a rotational movement of the at least one actuator arm on the at least one hinge support upon activation is translatable into a pivotal movement of the at least one actuator arm on the non-rotating sliding sleeve that is adapted to cause an axial displacement on the rotor shaft of the non-rotating sliding sleeve that is mounted to the rotor shaft,
wherein
the at least one hinge support comprises at least one carrier element that is adapted for carrying the at least one actuator arm, the at least one carrier element comprising composite material, and
wherein the at least one carrier element comprises at least one elastically deformable support arm.

2. The control system according to claim 1,
wherein the at least one elastically deformable support arm comprises at least one slotted section that is elastically deformable.

3. The control system according to claim 2,
wherein the at least one slotted section is defined by elastically deformable lamellas.

4. The control system according to claim 1,
wherein the at least one hinge support comprises a base element that is mountable to the rotary-wing aircraft, wherein the at least one carrier element is rigidly mounted to the base element.

5. The control system according to claim 4,
wherein the at least one carrier element is bonded to the base element.

6. The control system according to claim 4,
wherein the at least one elastically deformable support arm accommodates at least one barrel nut that is screwed to at least one screw that is attached to the base element.

7. The control system according to claim 1,
wherein the at least one carrier element comprises at least one accommodation that accommodates the at least one actuator arm.

8. The control system according to claim 7,
wherein the at least one accommodation is provided for the hinged support of the at least one actuator arm with a bearing that supports the at least one actuator arm in a rotatable manner.

9. The control system according to claim 1,
wherein the at least one actuator arm is at least partly implemented as a fork that is connected in a pivotal manner to a mounting part of the non-rotating sliding sleeve by means of an associated fork mounting point.

10. The control system according to claim 1,
wherein a swash plate assembly is provided, the swash plate assembly being mounted to the non-rotating sliding sleeve by means of a spherical bearing provided on the non-rotating sliding sleeve, wherein the swash plate assembly is provided for controlling collective and cyclic pitch of the rotor blades of a multi-blade rotor in a rotary-wing aircraft, to which the control system is mounted.

11. The control system according to claim 10,
wherein at least one actuator lever is provided for controlling tilting of the swash plate assembly in operation in order to perform cyclic pitch control, wherein the at least one actuator lever is rotatably mounted to the at least one actuator arm by means of an associated actuator lever pivot bearing.

12. The control system according to claim 11,
wherein the at least one actuator lever is connected to the swash plate assembly by means of associated swash plate control rods, and wherein the at least one actuator lever and the at least one actuator arm define a mixing lever gear unit.

13. The control system according to claim 11,
wherein the at least one actuator lever and the at least one actuator arm define a control input unit.

14. A rotary-wing aircraft with a multi-blade rotor having a plurality of rotor blades and a rotor shaft that defines an associated rotor axis, wherein a control system for controlling at least collective pitch of the plurality of rotor blades is provided, the control system comprising:
a non-rotating sliding sleeve that is mountable to the rotor shaft such that the non-rotating sliding sleeve is axially displaceable coaxially to the associated rotor axis on the rotor shaft,
at least one actuator arm that is pivotally mounted to the non-rotating sliding sleeve, the at least one actuator arm being adapted for axially displacing the non-rotating sliding sleeve that is mounted to the rotor shaft upon activation,
at least one hinge support that is adapted for a hinged support of the at least one actuator arm such that a rotational movement of the at least one actuator arm on the at least one hinge support upon activation is translatable into a pivotal movement of the at least one actuator arm on the non-rotating sliding sleeve that is adapted to cause an axial displacement on the rotor shaft of the non-rotating sliding sleeve that is mounted to the rotor shaft,
wherein
the at least one hinge support comprises at least one carrier element that is adapted for carrying the at least one actuator arm, the at least one carrier element comprising fiber reinforced composite material, and
wherein the at least one carrier element comprises at least one elastically deformable support arm.

15. The control system according to claim 14, wherein the at least one elastically deformable support arm comprises at least one slotted section that is elastically deformable.

16. The control system according to claim 14, wherein the at least one hinge support comprises a base element that is mountable to a gear box of the rotary-wing aircraft, wherein the at least one carrier element is rigidly mounted to the base element.

17. A rotary-wing aircraft with a multi-blade rotor having a plurality of rotor blades and a rotor shaft that defines an associated rotor axis, wherein a control system for controlling collective pitch of the plurality of rotor blades is provided, the control system comprising:

a non-rotating sliding sleeve mountable to the rotor shaft such that the non-rotating sliding sleeve is axially displaceable coaxially to the associated rotor axis on the rotor shaft, an actuator pivotally mounted to the non-rotating sliding sleeve, the actuator adapted to axially displace the non-rotating sliding sleeve upon activation, a hinge support adapted to support the actuator such that a rotational movement of the actuator on the hinge support upon activation is translatable into a pivotal movement of the actuator on the non-rotating sliding sleeve adapted to cause an axial displacement on the rotor shaft of the non-rotating sliding sleeve, wherein the hinge support comprises an elastically deformable carrier element adapted to carry the actuator, the carrier element comprising composite material, and the carrier element having a slotted section.

18. The control system according to claim 17, wherein the carrier element comprises at least one elastically deformable support arm.

19. The control system according to claim 17, wherein the slotted section is defined by elastically deformable lamellas.

20. The control system according to claim 17, wherein the hinge support comprises a base mountable to the rotary-wing aircraft, wherein the carrier element is rigidly mounted to the base.

\* \* \* \* \*